United States Patent [19]
Welker

[11] Patent Number: 6,091,489
[45] Date of Patent: Jul. 18, 2000

[54] OPTICAL INSPECTION APPARATUS FOR PRESSURIZED VESSELS

[75] Inventor: Brian H. Welker, Sugar Land, Tex.

[73] Assignee: Welker Engineering Company, Sugar Land, Tex.

[21] Appl. No.: 09/030,180

[22] Filed: Feb. 25, 1998

[51] Int. Cl.[7] .................................................. G01N 21/00
[52] U.S. Cl. ...................... 356/241.1; 359/367; 362/158; 73/861.25; 73/866.5
[58] Field of Search ............................. 356/241.1, 241.5, 356/241.6; 359/367; 73/861.25, 861.66, 866.83, 863.82, 863.83, 866.5; 385/117

[56] References Cited

U.S. PATENT DOCUMENTS

| | | | |
|---|---|---|---|
| 3,279,460 | 10/1966 | Sheldon | 356/241.1 |
| 4,011,017 | 3/1977 | Feurestein et al. | 356/241.6 |
| 4,440,496 | 4/1984 | Milana | 356/241.1 |
| 4,631,967 | 12/1986 | Welker | 73/861.25 |
| 4,678,290 | 7/1987 | Welker | 350/506 |
| 4,777,567 | 10/1988 | Welker et al. | 362/32 |

OTHER PUBLICATIONS

Olympus Industrial, "New Fiberoptic Imaging Technology . . . ", Jan. 1997, pp. 1–4.

Olympus Industrial, "Remote Visual Inspection of Natural Gas Pipeline Meters", Aug. 1997, pp. 1–4.

Crystal Systems, "Sapphire Material, Technology and Capabilities to Fill Your Production Requirements"4pp Approximate Date 1984.

F. Schmid and C.P. Khattak, "Large Crystal Sapphire Optics", Laser Focus, Sep. 1983.

Marshall Electronics, Inc., "Marshall Product News", approx. Feb. 1997, pp. 1–3.

*Primary Examiner*—Hoa Q. Pham
*Attorney, Agent, or Firm*—Herzog, Crebs & McGhee LLP

[57] ABSTRACT

An optic device for use in viewing the interior of pressurized vessels, especially high pressure fluid pipelines. Embodiments of the optic device allow manual or automatic insertion/retraction of the viewing head allowing variable depth viewing of the interior. The viewing head is capable of various embodiments including the ability to carry various optic devices and is adapted to withstand high pressures. The automatically insertable optic device can be either hydraulically or pneumatically actuated. Both the automatic and manual optic devices may be fixed or variable focus. The fixed focus devices utilize lenses, ultra-miniature color cameras, and fiberscopes either with or without integral light sources as part of the viewing head. The variable focus device utilizes lenses and a reflector. Preferably, the viewing head utilizes sapphire viewing windows which exhibit excellent light transmission and resistance to high pressures. In this manner, light may be received for pickup by the lenses, camera, fiberscope, or the like.

17 Claims, 6 Drawing Sheets

OPTICAL INSPECTION APPARATUS FOR PRESSURIZED VESSELS

BACKGROUND OF THE INVENTION a. Field of the Invention

The present invention relates to optical inspection devices and, more particularly, to optical inspection devices for use in pressurized vessels such as pipelines and the like.

b. Description of the Prior Art

In many instances, it is necessary to view the interior of pressurized vessels such as pipelines and the like in order to ascertain whether there has been any damage to particular parts of the pipeline such as orifice plates, or see if there is a clog or debris buildup which can affect accurate metering and/or flow of the pipeline product. For example, it may be necessary to view the interior of a pipeline metering station to determine if any damage or obstructions affect the orifice metering plate. Of course, such inspection cannot be accomplished without various equipment to enable one to remotely view the interior. Also, in cases where the pipeline product may be explosive, due consideration must be accorded potential hazards. Because of this, the prior art has provided various viewing devices.

One such viewing device is disclosed in U.S. Pat. No. 4,777,567 issued to Robert H. Welker et al. on Oct. 11, 1988. The viewing device of the '567 patent utilizes an explosion-proof light projector and viewing periscope particularly for viewing the interior of a gas pipeline metering station. Light from the external light projector is directed into the pipeline through a projector inserted through a bore in the pipeline, while a separate, fixed-depth periscope viewing device extends into the pipeline through a separate bore in the pipeline. The viewing device is not however, adapted for use in high-pressure environments.

Another such prior art viewing device is disclosed in U.S. Pat. No. 4,678,290 issued to Robert H. Welker on Jul. 7, 1987. The '290 viewing device is a fixed depth periscope assembly having an optical system including a lamp sealed therein for a light source. A flow of nitrogen gas is delivered to the battery pack for the lamp and periscope to surround the electrical components for explosion prevention. Again, however, the viewing is at a fixed depth, is not insertable and retractable, nor adapted for high pressure environment use.

Other prior art devices have been used such as endoscopes that rely upon fiber optic light guides for light transmission. However, these devices are not well suited for use in applications where the object to be examined is relatively far away from the viewing scope such as in pipeline applications.

In general, the prior art devices for viewing the interior of vessels including pipelines are not suited for high pressure environments as encountered in active product flowing pipelines, are not insertable or retractable, nor can they retract from their position within the pipeline without being totally removed from the vessel.

Furthermore, such prior art designs cannot, by their nature, take advantage of technologically advanced optic devices or viewing options, as such optic devices could be used to view other spectra or provide digitally capturable images, for example.

It is thus an object of the present invention to provide a variable depth optic device for viewing the interior of pressurized vessels.

It is another object of the present invention to provide an automatically insertable and retractable viewing device for pressurized vessels.

It is further an object of the present invention to provide a variable depth optic device for internal viewing of pressurized pipelines that includes an insertable and retractable viewing head adapted to carry various optic devices.

It is still further an object of the present invention to provide a viewing device that is insertable into and retractable from a pressurized pipeline and which has a viewing head capable of carrying various optic devices and able to withstand high pipeline pressures.

SUMMARY OF THE INVENTION

In keeping with the above objects, the present invention is an optic device for viewing the interior of high pressure vessels.

In one form thereof, the present optic device includes a viewing head that is axially displaceable within a pressurized pipeline for variable depth viewing. Axial movement of the viewing head may be automatic or manual. In the automatic embodiment, axial movement of the viewing head may be effected by hydraulic or pneumatic means. Viewing may be fixed or variable focus.

The viewing head may carry or contain various optic devices such as lenses and reflectors, board cameras, and fiberscopes, while the body of the device is adapted to contain any necessary wires or cables. A viewing aperture is disposed in a wall of the viewing head wherein a transmissive element, preferably sapphire window, is utilized to allow the transmission of light therethrough.

In another form, the present optic device is a combination light source and viewer incorporating the features described above.

Particularly, in general, a tubular or cylindrical piston carrying the viewing head extends from the piston frame or body and is adapted to axially move relative thereto. In the automatic mode the tubular piston and piston frame define internal variable volume chambers which may be selectively filled and/or evacuated to achieve axial movement. The viewing head contains the optic device for viewing the interior of the pipeline and is constructed to withstand high pipeline pressures, particularly with the use of a sapphire window for the viewing port through which any various type of optic device may peer. Any necessary wires are arranged in the piston frame and extend to the opposite end of the tubular piston.

BRIEF DESCRIPTION OF THE DRAWINGS

So that the manner in which the above recited features, advantages and objects of the present invention are attained and can be understood in detail, a more particular description of the invention briefly summarized above, may be had with reference to the embodiments which are illustrated in the appended drawings, wherein.

It is to be noted, however, that the appended drawings illustrate only typical embodiments of the invention and are therefore not to be considered limiting of its scope, for the invention may admit to other equally effective embodiments, or combinations of those shown.

DETAILED DESCRIPTION OF THE INVENTION

Figure 1:
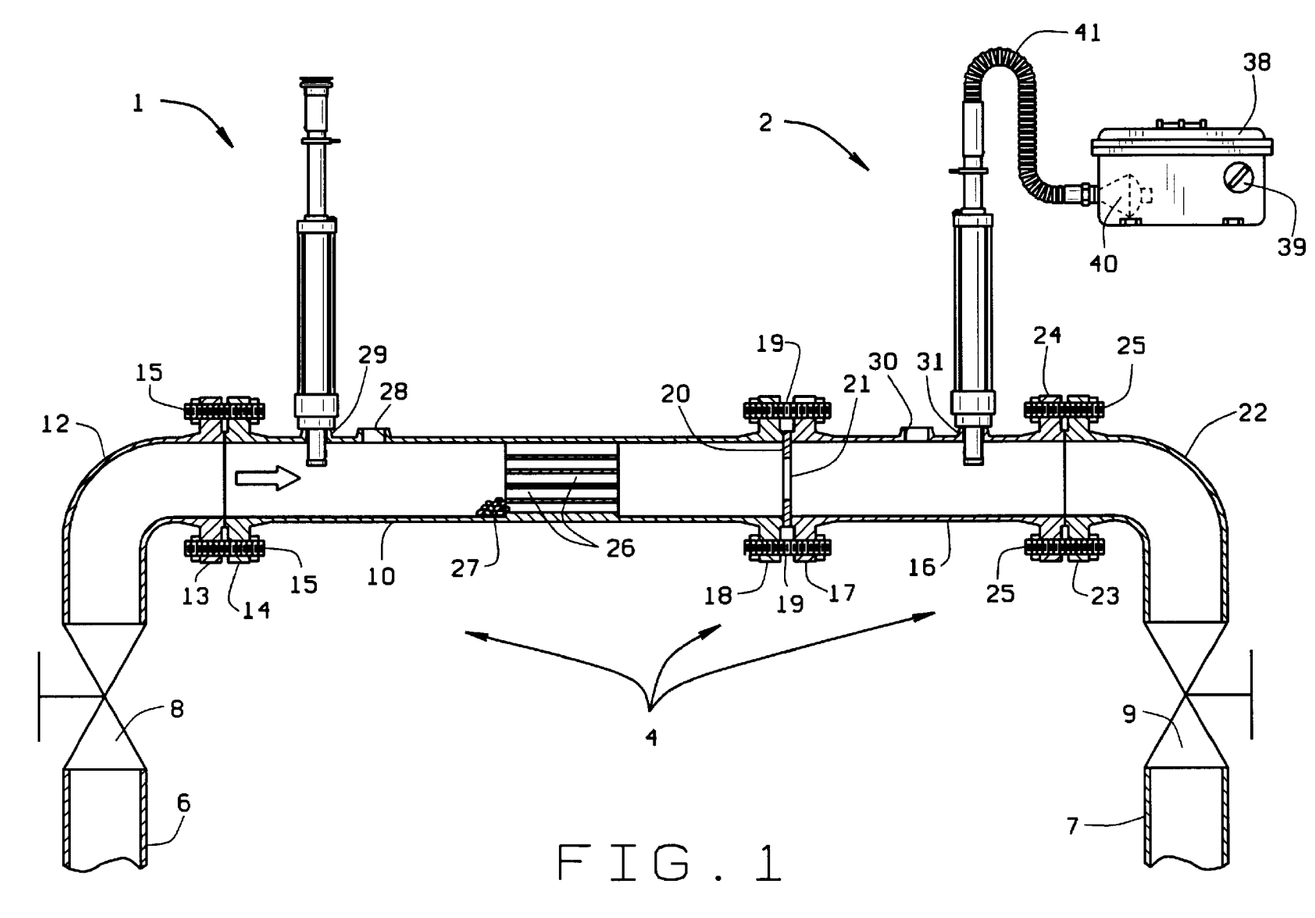
FIG. 1 is a cross-sectional view of a pipeline metering station with an automatically insertable version of the present optical inspection apparatus disposed therein.

Referring to FIG. 1, numeral 1 generally refers to an embodiment of the present optical viewing or inspection device. The optical viewing device 1 may utilize an external light source, such as an explosion-proof light system 2 as depicted. Such explosion-proof light systems may be as those disclosed and discussed in U.S. Pat. No. 4,777,567. Arbitrarily, the optical viewing device 1 is shown in FIG. 1 as the direct-view type, however, other types as disclosed herein may be substituted therefor. Numeral 4 refers generally to a metering station for which the present optical viewing device may be used. The metering station 4 usually extends from the ground (not shown) and is connected to a pipeline inlet 6 and outlet 7. Isolation from the pipeline is accomplished by valves 8 and 9 associated respectively with the inlet 6 and outlet 7.

The valve 8 connects to a meter tube 10 by a 90 degree fitting 12 providing communication between the pipeline and the metering station 4. Connection between the meter tube 10 and the 90 degree fitting 12 is effected by a flange 13 formed on one end thereof that corresponds with a flange 14 formed on one end of the meter tube 10 by several bolts 15 extending about the flanges. The pipeline product flows within the metering station 4 as indicated by the arrow. At the downstream end of the meter tube 10 is a spool 16. The spool 16 has a flange 17 formed on one end thereof that is connected to a flange 18 formed on the end of the meter tube 10 opposite the flange 14 by several bolts 19 extending about the flanges 17, 18. Generally disposed between the flange 18 of the meter tube 10 and the flange 17 of the spool 16 is an orifice plate 20. The orifice plate 20 has a passageway 21 formed therein and is sized so that the amount of pipeline product passing through the meter station 4 may be calculated according to various charts and tables provided for that purpose. The bolts 19 provide compression between the flanges 17, 18 to retain the orifice plate 20. The spool 16 is connected to and in communication with the valve 9 by another 90 degree fitting 22. The 90 degree fitting 22 has a flange 23 that connects to a flange 24 on another end of the spool 16 by several bolts 25.

Disposed within an upstream portion of the meter tube 10 are straightening vanes 26 that are designed to produce a laminar flow of pipeline product prior to contact with the orifice plate 20. Turbulence reduction increases the metering accuracy of the orifice plate 20. When the valves 8 and 9 are open, the pipeline product enters the metering station 4 via inlet 6, flows into the meter tube 10, past the vanes 26 and through the orifice plate opening 21 for measurement, and exits via flow through the spool 16, fitting 22, and outlet 7. Build-ups or deposits 27 may appear near the vanes 26 as a consequence thereof.

The meter tube 10 has two fittings 28, 29 that define passageways from the exterior of the meter tube 10 and the interior of the meter tube 10. One end of the viewing device 1 is disposed in the fitting 29, while the fitting 28 is shown open without a normal bullplug disposed therein. During operation, the fittings 28, 29 are plugged in some manner, such as with a bullplug or instrument. The spool 16 likewise has two fittings 30, 31 that define passageways from the exterior of the spool 16 and the interior of the spool 16. One end of the light source 2 is disposed in the fitting 31, while the fitting 30 is shown open without a normal bullplug disposed therein. Again, during operation, the fittings 30, 31 are plugged in some manner, such as with a bullplug or instrument.

In applications of some embodiments of the present invention, an external light source needs to be projected into the metering station 4. For this a light source 2 is shown. Generally, the light source 2 includes an explosive-proof housing 38 that is coupled to a suitable power supply (not shown). An explosive-proof controller 39 controls the lamp 40. The light from the lamp 40 is projected through the hose 41 and into a housing 36 that extends into the pipe and which projects the light into the pipe, as by a fiberoptic light guide system.

Thus, in FIG. 1, a light generated by a light system (2) is projected into the pipeline while a viewing device (1) that extends into the pipeline utilizes the projected light to view the interior of the pipeline. One aspect of the present invention lies in the viewing device.

Figure 2:
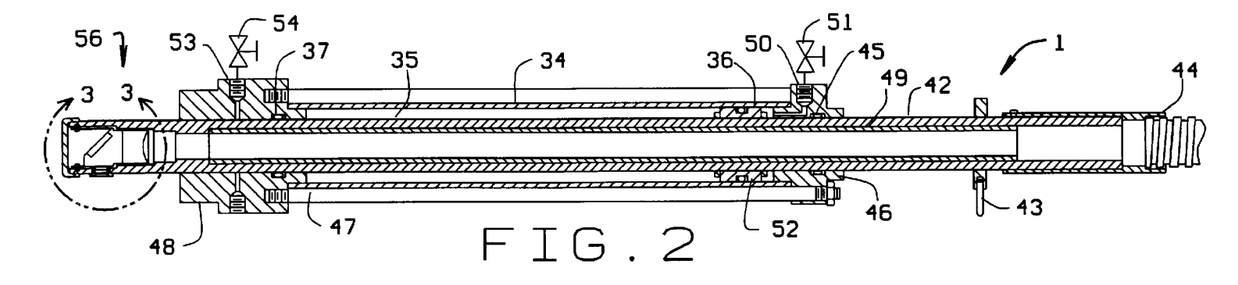
FIG. 2 is a cross-sectional view of an embodiment of an automatically insertable optical inspection device having a fixed, passive magnification system.
Figure 3:
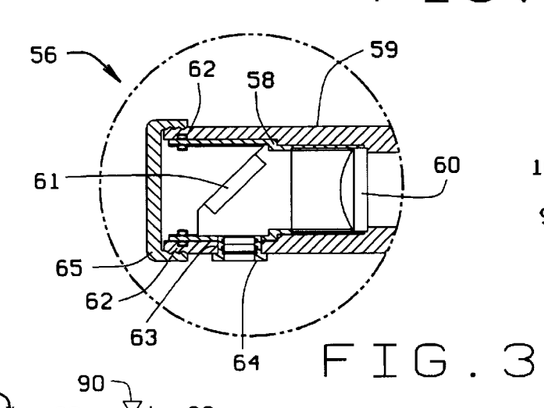
FIG. 3 is an enlarged cross-sectional view of an end of the insertable optical inspection device of FIG. 2 taken along circle 3—3 thereof.

Referring now to FIGS. 2 and 3, there is shown a fixed magnification type viewing device 1 having an adjustable depth viewing head. The viewing device 1 includes a cylindrical or tubular body 34 supported between an upper head 46 and a lower head 48, the heads 46, 48 being held together by bolts 47 extending thereabout. The heads 46, 48 have O-ringed bores 45, 37 respectively, that movably support an elongate piston tube or cylinder 42 which extends therethrough, the tube 42 carrying an inner tube 49. The inner surface of the body 34 and the outer surface of the tube 42 between the heads 46, 48 define a cavity that is divided into a first variable volume 36 and a second variable volume 35 by an O-ringed annular sleeve or ring 52. The first variable volume 36 is in communication with atmosphere via a conduit 50 in the upper head 46 to which is coupled a valve 51. The second variable volume 35 is in communication with atmosphere via a conduit 53 in the lower head 48 to which is coupled a valve 54. In this manner the tube 42 is axially movable via hydraulic or pneumatic pressure through appropriate application to or evacuation from the valves 51 and 54. Coupled to the upper end of the tube 42 is a conduit piece 44 for viewing and a stop or manual tube positioner 43.

With particular reference to FIG. 3 the viewing head 56 attached to another end of the tube 42 is shown in greater detail. The viewing head 56 in this embodiment includes a holder 58 that is configured to be received in an end 59 of the tube 42. The holder 58 is secured to the inside of the end 59 via fasteners 62 with an end cap 65 threadedly received on the end 59. Retained on an end of the holder 58 proximate the conduit piece 44 is an optic lens 60, here a convex optic lens, for focusing any received light rays axially through the tube 42 towards the conduit piece 44. The holder 58 also carries a reflector 61 that is angled so as to redirect the light entering through a window 64 threadedly disposed in a bore 63 in the side of the end 59. The window 64 allows light to enter the inside of the tube 42 to be reflected by the reflector 61 into the lens 60 which focuses the light towards the conduit piece 44. This configuration has a side field of view. Because the present invention is designed to be used in high pressure environments, the window 64 must be suitable for such use.

According to an aspect of the present invention, the window 64 is preferably an HEM$^{rm}$ (Heat Exchange Method) sapphire window manufactured by Crystal Systems of Salem, Mass. Such a sapphire provides outstanding optical and physical properties for the present application and is characterized by good thermal conductivity and low expansion, along with high meltpoint and high strength, permitting use at high temperatures and under high thermal and mechanical shock conditions. Several grades are manufactured.

Figure 4:
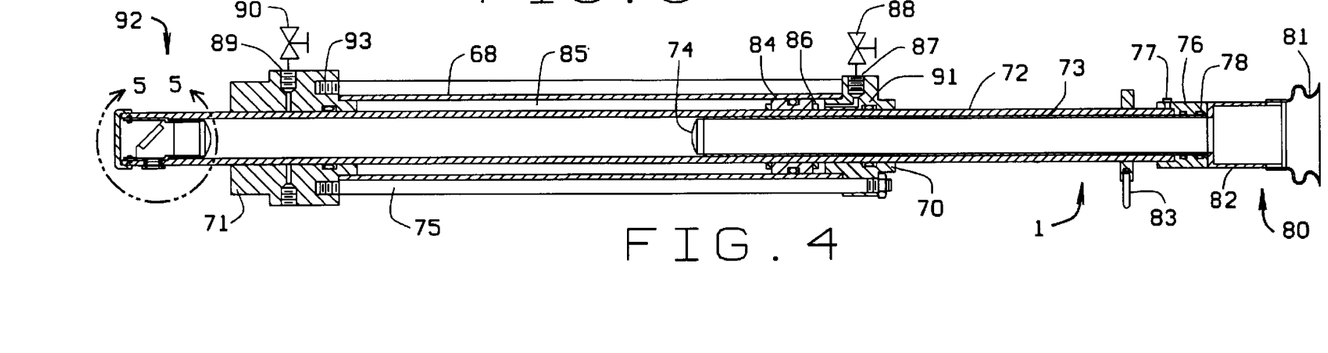
FIG. 4 is a cross-sectional view of another embodiment of the automatically insertable optical inspection device having an adjustable, passive magnification system.
Figure 5:
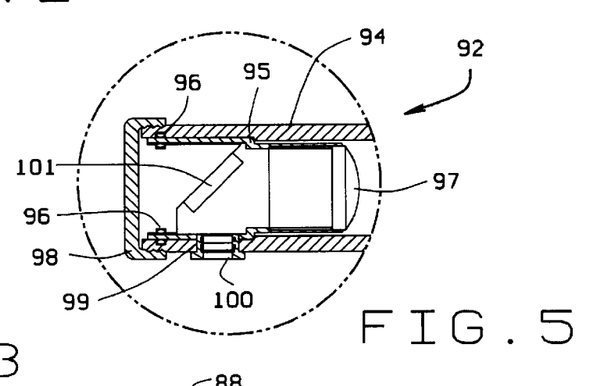
FIG. 5 is an enlarged cross-sectional view of an end of the insertable optical inspection device of FIG. 4 taken along circle 5—5 thereof.

Referring now to FIGS. 4 and 5, there is shown an adjustable magnification viewing device 1. In this embodiment, a cylindrical body 68 is retained between an upper head 70 and a lower head 71 by several bolts 75. A tubular piston or cylinder 72 is axially movably supported by the upper and lower heads 70, 71 by O-ringed bores 91, 93 respectively in the upper and lower heads 70, 71. The inner surface of the body 68 and the outer surface of the tube 72 define a cavity that is divided into a first variable volume 85 and a second variable volume 86 by an O-ringed annular sleeve or ring 84 disposed about the tube 72 between the heads 70, 71. The upper head 70 includes a conduit 87 therein providing communication between a valve 88 (atmosphere) and the second variable volume 86, while the lower head 71 includes a conduit 89 providing communication between a valve 90 (atmosphere) and the first variable volume 85. Again, in this manner, the tube 72 is axially movable via selective application or evacuation of hydraulic or pneumatic means (not shown).

A viewing head 92 is disposed at one end of the tube 72 that extends beyond the lower head 71 and whose detail is described below with reference to FIG. 5. In this embodiment, the viewing head includes a optic system including a lens to direct incoming light axially through the tube 72 to an end thereof distal to the viewing head 92. Disposed at the end of the tube 72 distal to the viewing head 92 is an eyepiece structure 80 that includes a flexible eyepiece 81 attached to a holder 82. The holder 82 is attached to the end of a secondary tube 73 that is axially movably disposed within and relative to the tube 72. A seal between the tubes 72, 73 is provided by an adapter sleeve 76 that is coupled by rivets 77 to the end of the tube 72 and includes an O-ringed bore 78. Carried at an end of the secondary tube 73 distal the eyepiece structure 80 is a lens 74. Movement of the secondary tube 73 is manually effected and constitutes the focusing of the device 1.

With particular reference now to FIG. 5 the viewing head 92 is shown in detail. The viewing head is disposed at an end 94 of the tube 72 and includes a holder 95 situated within the end 94 and coupled thereto via rivets 96. An end cap 98 is threadedly received on the end 94 providing a seal. The holder 95 carries a lens 97 having an axial focus corresponding to the axis of the tubes 72, 73 such that light entering the lens 97 is directed to the lens 74 of the secondary tube 73. Disposed in a side wall of the end 94 is a bore 99 in which is situated a transmissive element or window 100, again preferably being a sapphire window. Light enters through the window 100 and is directed by a reflector or mirror 101 disposed at a 45 degree angle to reflect and direct the received light axially to the lens 97 which directs the light to the lens 74. While the secondary tube 73 is carried by the tube 72, variable focusing is achieved by the axial movement or displacement of the secondary tube 73 relative to the tube 72. It should also be noted that the device presented in FIGS. 4 and 5 is generally used with a separate light source while any image is viewed by the eye of the observer.

Figure 6:
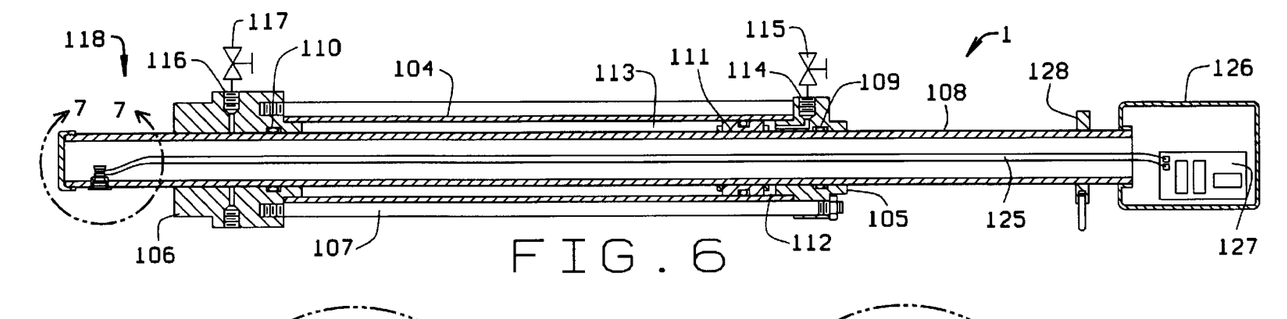
FIG. 6 is a cross-sectional view of a further embodiment of the automatically insertable optical inspection device having an ultra-miniature color camera system.
Figures 7, 8, 9:
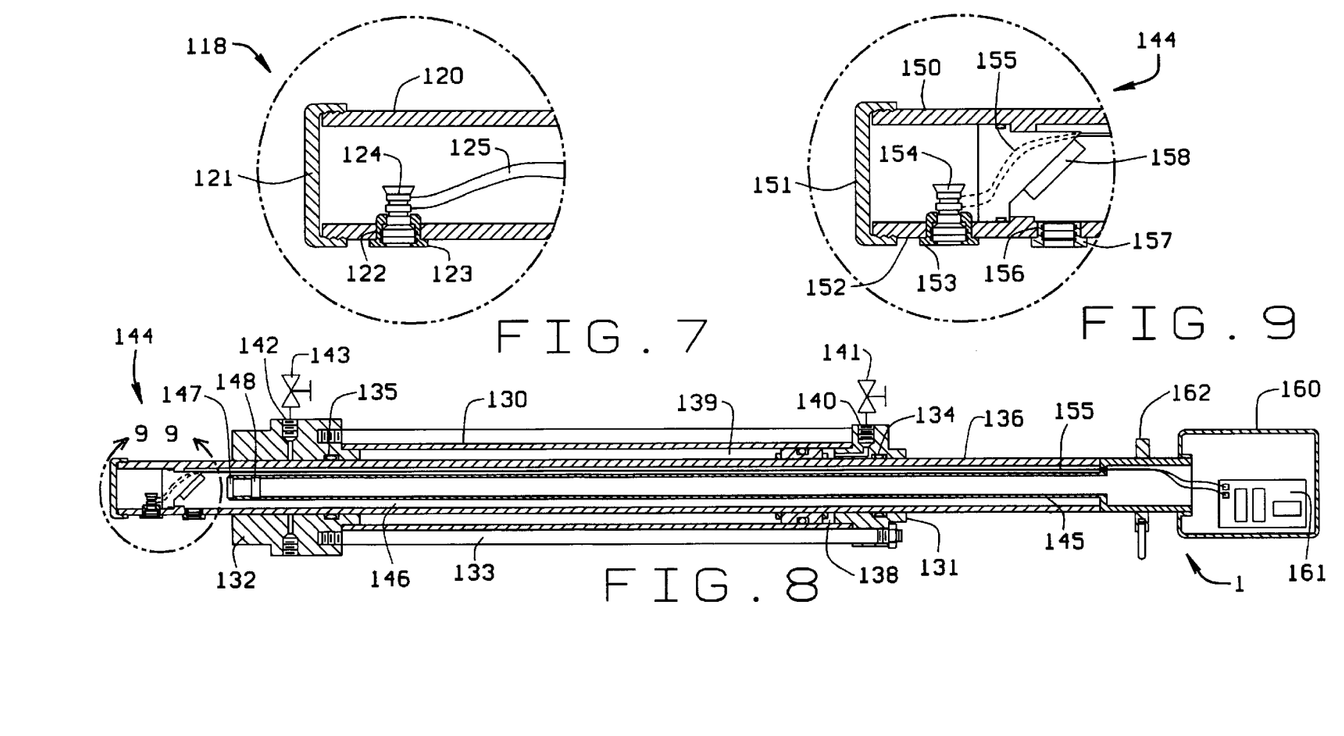
FIG. 7 is an enlarged cross-sectional view of an end of the insertable optical inspection device of FIG. 6 taken along circle 7—7 thereof.
FIG. 8 is a cross-sectional view of a yet further embodiment of the automatically insertable optical inspection device having an ultra-miniature color camera and an integral light source.
FIG. 9 is an enlarged cross-sectional view of an end of the insertable optical inspection device of FIG. 8 taken along circle 9—9 thereof.

With reference now to FIGS. 6 and 7 there is shown another embodiment of the present optic or viewing device 1, here an automatically actuated viewing device having an electronic optic device. Again, the optic device includes a tubular body or cylinder 104 retained between an upper head 105 and a lower head 106 by bolts 107. A main tube or cylinder 108 extends through O-ringed bores 109,110 respectively in the heads 105,106. In this manner the tube 108 is axially movable relative to the body 104 and heads 105, 106. Again, the outer surface of the tube 108 and the inner surface of the body 104 defines an internal cavity that is divided into a first variable volume 112 and a second variable volume 113 by an annular O-ringed sleeve 111 that surrounds the tube 108 between the heads 105,106. The head 105 includes a conduit 114 that provides communication between the first variable volume 112 and a valve 115 (atmosphere) while the head 106 includes a conduit 116 that provides communication between the second variable volume 113 and a valve 117 (atmosphere) wherein selective evacuation or application of hydraulic or pneumatic means (not shown) effects axial movement of the tube 108 such that the viewing head 118 carried by the tube 108 may be inserted at various depths into the vessel (not shown) or retracted therefrom.

With additional reference to FIG. 7, the viewing head 118 is shown. In this embodiment, the viewing head is disposed at an end 120 of the tube 108 which is sealed by a threadedly received end cap 121. An aperture 122 is disposed in a side wall of the end 120 in which is disposed a viewing window 123, again preferably a sapphire window. Retained adjacent the viewing window 123 is a camera head 124. The camera head 124 can be of any suitable type, however preferably used are electronic analog or digital board cameras such as those manufactured by Marshall Electronics Inc. of Culver City, Calif. Especially suited for the present application is the Marshall ultra-miniature color board camera with flexible head, known as the V-1234 & V-1234XL models, in which the camera lens is coupled to a circuit board via a ribbon cable or jumper, however, other suitable board cameras may be utilized. In FIG. 6, the camera 124 is coupled via leads 125 to a circuit board 127 contained in an enclosure 126 disposed at the end of the tube 108 distal to the viewing head 118. The leads 125 extend through the interior of the tube 108. The circuit board 127 is coupled to a source of power (not shown) that can be in the enclosure 126 or external thereto. Additionally, the circuit board 127 is adapted to be coupled to a computer (not shown) or other device according to the manufacturer's specifications in order to convert the electrical signals into a viewable image. A ring 128 is also disposed about the tube 108 external to the head 105 for manual axial movement of the tube 108.

It should here be noted that all of the automatically actuated embodiments may be manually operated should hydraulic or pneumatic means not be available or working.

Referring now to FIGS. 8 and 9, there is shown a further embodiment of the present viewing device 1. Here, there is depicted a viewing device utilizing a board camera as in FIGS. 6 and 7, but with an integral light source. The viewing device 1 includes a cylindrical body 130 retained between a first head 131 and a second head 132 by a plurality of bolts 133. The first head 131 includes an O-ringed bore 134 and the second head 132 includes an O-ringed bore 135 through which is axially movably disposed a tube or cylinder 136. An annular O-ringed sleeve 137 is disposed about the cylinder 136 between the first and second heads 131,132 and defines a first variable volume 138 and a second variable volume 139 on either side thereof between an inner surface of the tube 130 and an outer surface of the cylinder 136. The first head 131 includes a conduit 140 providing communication between the first variable volume 138 and a valve 141 (atmosphere) while the second head 132 includes a conduit 142 providing communication between the second variable volume 139 and a valve 143 (atmosphere). Selective introduction and evacuation of the variable volumes 138,139 through the valves 141,143 by pneumatic or hydraulic pressure effects axial movement of the cylinder 136. However, should manual operation be desired, a handle 162 is provided on the cylinder 136 which also serves as an axial stop for the cylinder 136. A second cylinder or tube 145 is coaxially disposed within the interior 146 of the tube 136, being fixedly coupled thereto. At one end of the tube 145 is a lens set having a first and second lens 147,148 adapted to transmit and direct light therethrough. A light source (not shown) would be provided that would be directed through the tube 145 and into the lenses 147,148. Such a light source system is used in conjunction with a viewing head 144.

The viewing head 144 is disposed at one end of the cylinder 136 opposite to an enclosure 160 disposed at another end of the cylinder 136. The enclosure 160 housing any necessary circuit boards 161 for the components disposed in the viewing head 144. With specific reference to FIG. 9, the viewing head 144 is depicted in greater detail. The viewing head 144 is at one end 150 of the cylinder 136 and includes a threadedly received end cap 151. A first aperture 152 is disposed in a side wall of the end 150 in which is disposed a window 153, preferably a sapphire window. A camera 154 is situated adjacent the window 153 whose leads 155 extend along the interior 146 between the tubes 136, 145 and into the board 161. A second aperture 156 is disposed in the side wall of the end 150 axially above the first aperture 152 in which is disposed a window 157, again preferably a sapphire window. A 45 degree angled mirror or reflector 158 is situated within the viewing head 144 so as to receive light from the lenses 147, 148, and direct the light out through the window 157. This projects the light into the interior of the pipeline for pickup by the camera 154. The camera 154 is as described above. In this embodiment, the separate light source as depicted in FIG. 1 would generally not be necessary as the two are integral.

Figure 10:
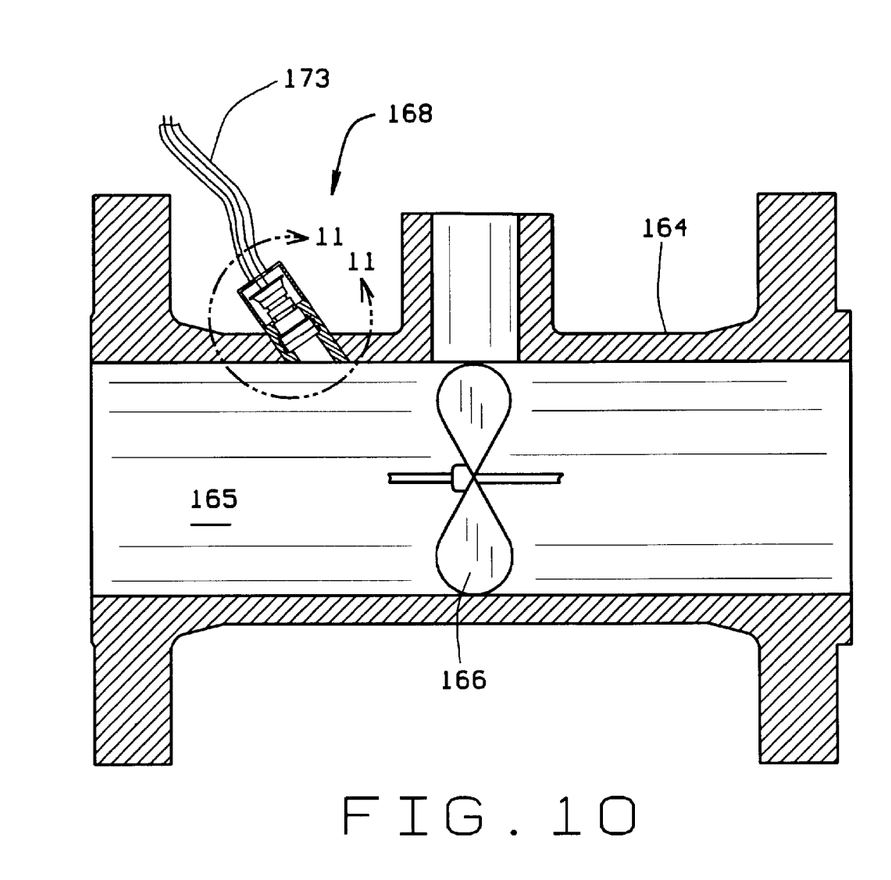
FIG. 10 is a cross-sectional view of a fixed optical inspection system having an ultra-miniature color camera mounted into a section of pipeline.
Figure 11:
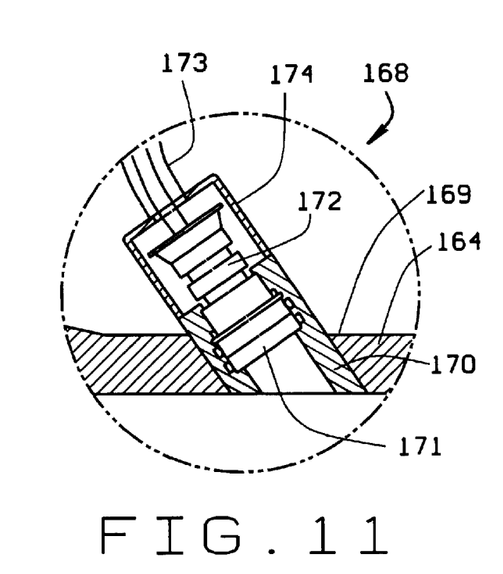
FIG. 11 is an enlarged cross-sectional view of the optical inspection system of FIG. 10 taken along circle 11—11 thereof.
Figure 12:
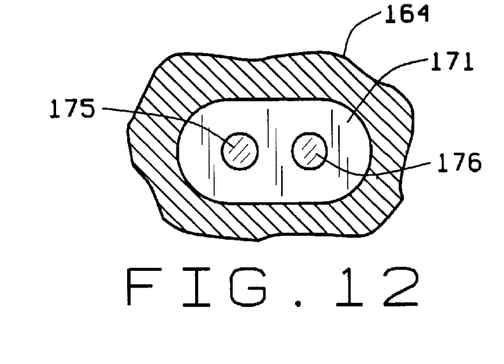
FIG. 12 is a bottom view of the optical inspection system of FIG. 10.

With reference now to FIGS. 10, 11 and 12, there is depicted another embodiment of a viewing device. The viewing device of FIGS. 10–12 is permanently installed within a structure. Depicted in FIG. 10 is a section of pipe generally designated 164 defining an interior 165. Shown disposed in the interior 165 is a vane device 166. The vane device 166 is representative of anything within the pipe section 164 that needs to be viewed. Strategically disposed in a side wall of the pipe section 164 is a viewing assembly 168. The viewing assembly 168 includes a bore 169 in a side wall of the pipe section 164 and preferably an angle bore to be able to effectively view the interior 165. A sleeve 170 is disposed in the housing and retains a window 171 therein, preferably a sapphire window. Situated adjacent the window 171 is a camera 172 having leads 173 in communication with a circuit board (not shown), the camera type disclosed above. A light source 176 is disposed adjacent the camera 172. Referring to FIG. 12, a bottom view of the viewing assembly 168 is shown. A camera lens 175 is disposed adjacent the light source 176 as seen through the window 171.

With additional reference to FIGS. 13–17 there is depicted yet another embodiment of the present viewing device 1. A cylindrical body 180 is retained between a first head 181 and a second head 182 by a plurality of bolts 183. The first head 181 includes an O-ringed bore 184 and the second head 182 includes an O-ringed bore 185 through which is axially movably disposed a cylinder or tube 186. Disposed about the cylinder is an annular, O-ringed sleeve 187 that together with an inner surface of the cylinder 180 and an outer surface of the cylinder 186 between the first and second heads 181,182 defines a first variable volume 188 and a second variable volume 189. The first head 181 includes a conduit 190 providing communication between the first variable volume 188 and a valve 191 (atmosphere). The second head 182 includes a conduit 192 providing communication between the second variable volume 189 and a valve 193 (atmosphere). Again, by selective application and evacuation of the variable volumes 188,189, axial movement of the cylinder 186 may be effected. However, for many movement and as an axial stop, a ring 196 is provided about the cylinder 186. Disposed within the cylinder 186 is a fiberscope 198 that is retained by a sleeve 194 that is riveted 195 to an end of the cylinder 186. The fiberscope has a flexible optic guide 199 that extends to the viewing head 200. Such a fiberscope may be that manufactured by Olympus America, Inc. Industrial Products Group of Melville, N.Y.

Figures 13, 14, 15, 16, 17:
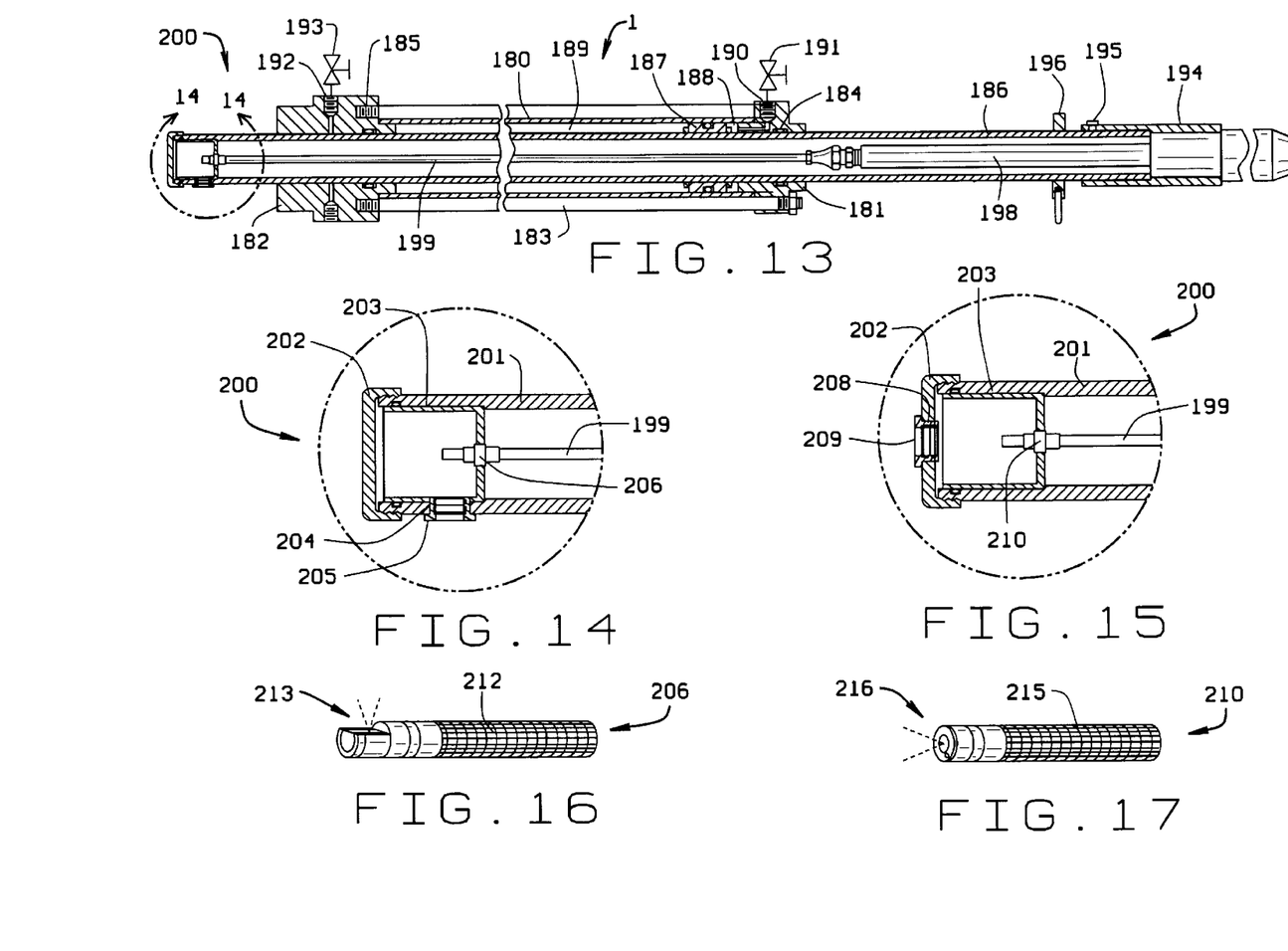
FIG. 13 is a cross-sectional view of a still another embodiment of the automatically insertable optical inspection device having a side field of view fibrescope type optic system.
FIG. 14 is an enlarged cross-sectional view of an end of the insertable optical inspection device of FIG. 13 taken along circle 14—14 thereof.
FIG. 15 is an enlarged cross-sectional view of the end of the insertable optical inspection device of FIG. 13 fitted with a front field of view fiberscope optic system.
FIG. 16 is a perspective view of a side field of view fiberscope.
FIG. 17 is a perspective view of a front field of view fiberscope.

The viewing head 200 may take different forms as exemplified in FIGS. 14 and 15. Referring to FIG. 14 and as depicted generally in FIG. 13, the viewing head 200 is disposed on an end 201 of the cylinder 186 with an end cap 202 threadedly received thereon. Within the end 201 is a sleeve 203 that carries an optical viewing tip 206 of the fiberscope 198. With additional reference to FIG. 16 the optical viewing tip 206 includes a body 212 and a side field of view optic tip 213. Thus, an aperture 204 is disposed in a side wall of the end 201 in which is received a window sealed by O-rings 205 and, preferably, a sapphire window.

With reference to FIGS. 15 and 17, an end or front view optic tip 210 is shown. The end cap 202 includes an aperture 208 in which is disposed a viewing window 209, preferably an O-ringed sapphire window. The optic tip 210 includes a body 215 and a front direction of view head 216.

It should be understood that various types of optic viewing tips are available depending on the desired field of view and direction of view. This make the fiberscope embodiment versatile.

Figure 18:
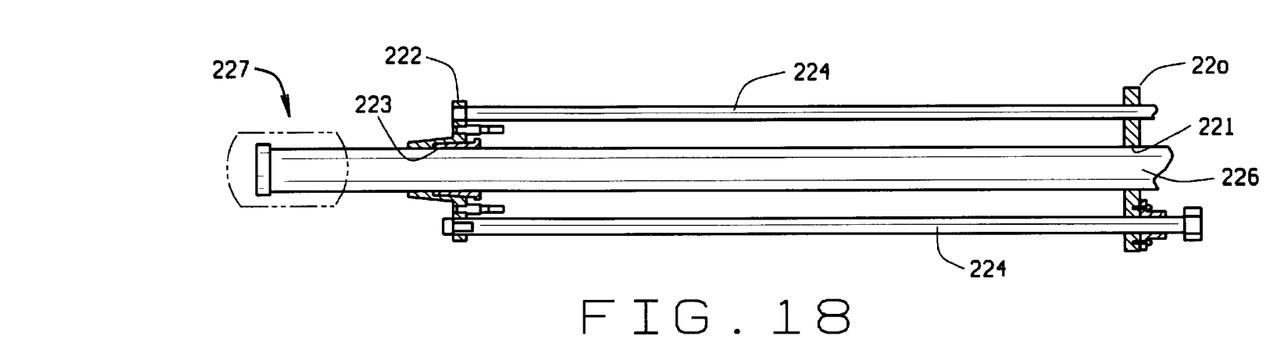
FIG. 18 is a cross-sectional view of a manually insertable optical inspection device.
Figures 19, 20, 21:
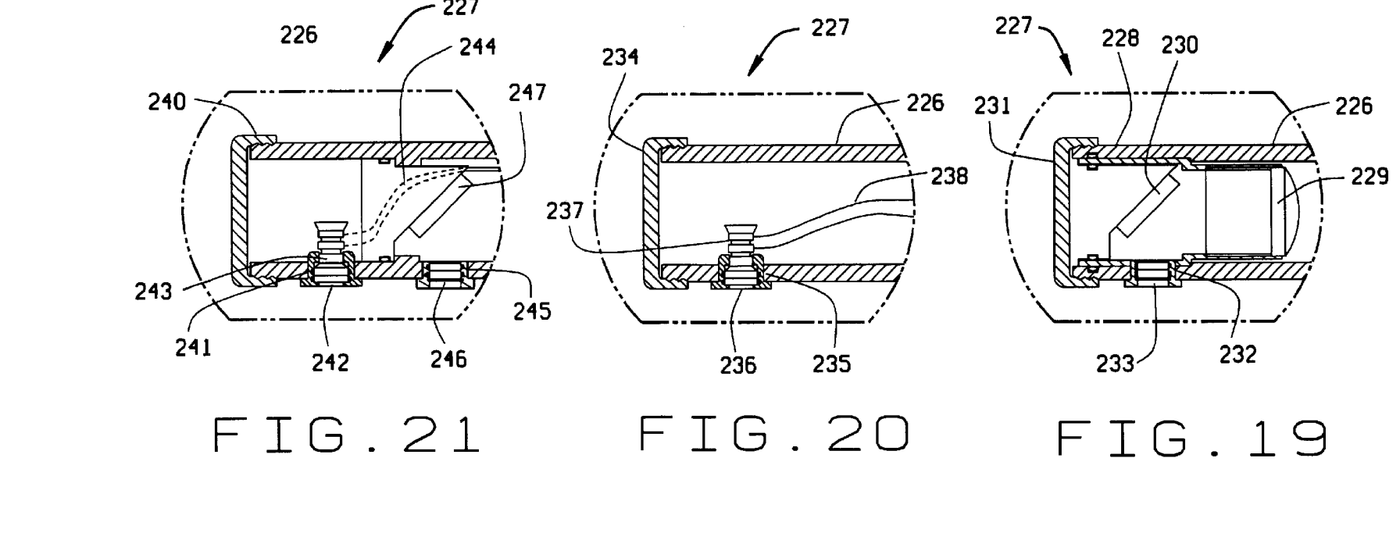
FIG. 19 is an enlarged cross-sectional view of an end of the manually insertable optical inspection device of FIG. 18 having a passive magnification system.
FIG. 20 is an enlarged cross-sectional view of the end of the manually insertable optical inspection device of FIG. 18 having an ultra-miniature color camera system.
FIG. 21 is an enlarged cross-sectional view of the end of the manually insertable optical inspection device of FIG. 18 having a combination ultra-miniature color camera and light source system.

Referring lastly to FIGS. 18–21, there is depicted a manual embodiment of the present viewing device 1. FIG. 18 depicts the viewing device 1 with a first head 220 having a first bore 221 and a second head 222 having a second bore 223 retained by bolts 224. An axially movable tube 226 is disposed in the first and second bores 221, 223 and terminates at one end in a viewing head 227. As depicted in FIGS. 19–21, the viewing head 227 may take various forms. FIG. 19 depicts an optic system utilizing a lens 229 and reflector 230. The end of the tube 226 includes an end cap 234 threadedly received on the end and a sleeve 228 that carries the 45 degree angled reflector 230 and lens 229 for axially directing any received light. An aperture 232 is disposed in a side wall of the end in which is a viewing window 233, preferably a sapphire window. FIG. 20 depicts the use of a board camera 237 disposed adjacent a preferably sapphire viewing window 236 situated in an aperture 235 in the side wall of the end of the tube 226. Leads 238 extend from the camera 236, of the kind described above, to an associated circuit board (not shown) preferably in an enclosure (not shown) at the other end of the tube 226 (not shown). In FIG. 21, an end cap 240 is threadedly received on the end of the tube 226 while a first aperture 241 is disposed in a side wall with a viewing window 242, preferably a sapphire window, disposed therein. A camera 243 of like kind to those above, is disposed adjacent the window 242 for receipt of incoming light. Leads 244 again are coupled to a circuit board (not shown). Additionally, a second aperture 245 is disposed in a side wall of the end adjacent the first aperture 241. Again, a window 236, preferably a sapphire window is disposed in the second aperture 235. An angled mirror 247 is adapted to direct internal light out through the window 242 to provide light for the camera 242.

It should also be understood that the present invention is adapted for use in high pressure environments such as product-flowing pipelines. Therefore, the viewing head is constructed so as to withstand such pressures, and thus the preference for a sapphire window.

It is also apparent from the foregoing, that the present invention is not limited to the embodiments shown. Other equally effective embodiments are contemplated and within the scope of the present invention.

What is claimed is:

1. An optic device for use with high pressure vessels, the optic device comprising:
   a body including a cylinder retained between an upper head and a lower head, said upper head having a first axial bore, said lower head having a second axial bore, said first axial bore and said second axial bore being coaxial with said cylinder, said body adapted to be coupled to an exterior of the high pressure vessel;
   a reciprocatable hollow tube coaxially extending through said cylinder and said first and second axial bores;
   a pressure resistant viewing head at one end of said hollow reciprocatable tube, said viewing head adapted to extend into the pressurized vessel upon movement of said tube and receive light from within the high pressure vessel;
   a cavity is defined between an outer surface of said reciprocatable hollow tube and an inside surface of said cylinder, said device further comprising a piston ring disposed on the outside surface of and about said reciprocatable hollow tube, said piston ring dividing said cavity into an upper variable volume chamber and a lower variable volume chamber, the volume of said chambers being dependent upon the axial position of said reciprocatable hollow tube relative to said cylinder;
   a first port in said upper head providing communication between said first variable volume chamber and atmosphere; and
   a second port in said lower head providing communication between said second variable volume chamber and atmosphere,
   whereby selective pressurization and evacuation of said first and second variable volume chambers via said respective first and second ports effects axial movement of said reciprocatable hollow tube to effect insertion and retraction of said viewing head into and out of the vessel.

2. The optic device of claim 1, wherein said viewing head includes an aperture providing communication between an inside of said reciprocatable hollow tube and an exterior thereof, a viewing window disposed in said aperture, and a fixed focus viewer adapted to receive and direct light entering said viewing window through said tube.

3. The optic device of claim 2, wherein said viewing window is a sapphire window.

4. The optic device of claim 3, wherein said aperture is disposed in a side wall of said viewing head, and said fixed focus viewer is a lens.

5. The optic device of claim 4, wherein a focal axis of said lens is coaxial with said tube, and further comprising a reflector positioned in said viewing head so as to receive light from said sapphire window and direct the received light to said lens.

6. The optic device of claim 3, wherein said fixed focus viewer is a camera adapted to receive the light entering said sapphire window through said tube.

7. The optic device of claim 6, wherein said camera is an on-board camera.

8. The optic device of claim 7, wherein said on-board camera is an ultra-miniature color camera.

9. The optic device of claim 6, further comprising:
   a second aperture in said viewing head having a second window therein; and
   a light source adapted to project light out through said second window and into the vessel.

10. The optic device of claim 9, wherein said second window is a sapphire window, and said light source includes a lens and reflector adapted to focus and direct source light through said second window.

11. The optic device of claim 3, wherein said fixed focus viewer is a fiberscope adapted to receive light through said viewing window.

12. The optic device of claim 11, wherein said aperture is disposed in a side wall of said viewing head, and said fiberscope has a side field of view.

13. The optic device of claim 11, wherein said aperture is disposed in an end wall of said viewing head, and said fiberscope has an end field of view.

14. The optic device of claim 1, further comprising:

said viewing head including an aperture providing communication between an inside of said reciprocatable hollow tube and an exterior thereof, a viewing window disposed in said aperture, and a first lens adapted to receive and direct light entering said viewing window through said reciprocatable hollow tube;

a secondary reciprocatable hollow tube coaxially disposed within said reciprocatable hollow tube and axially movable relative to and independently of said reciprocatable hollow tube; and a secondary lens disposed at one end of said secondary reciprocatable hollow tube proximate said viewing head;

whereby focusing of received light is achieved by axially moving said secondary reciprocatable hollow tube relative to said reciprocatable hollow tube.

15. The optic device of claim 14, wherein said viewing window is a sapphire window.

16. The optic device of claim 15, wherein said aperture is disposed in a side wall of said reciprocatable hollow tube, and further comprising a reflector disposed in said viewing head and adapted to reflect received light from said sapphire window into said first lens.

17. An optic device for use with high pressure vessels, the optic device comprising:

a body including a cylinder retained between an upper head and a lower head, said upper head having a first axial bore, said lower head having a second axial bore, said first axial bore and said second axial bore being coaxial with said cylinder, said body adapted to be coupled to an exterior of the high pressure vessel;

a reciprocatable hollow tube coaxially extending through said cylinder and said first and second axial bores;

a viewing head at one end of said hollow reciprocatable tube having an aperture with a transmissive window disposed therein for allowing two-way transmission of light between the interior of said reciprocatable hollow tube and an exterior thereof;

a cavity is defined between an outer surface of said reciprocatable hollow tube and an inside surface of said cylinder, said device further comprising a piston ring disposed on the outside surface of and about said reciprocatable hollow tube, said piston ring dividing said cavity into an upper variable volume chamber and a lower variable volume chamber, the volume of said chambers being dependent upon the axial position of said reciprocatable hollow tube relative to said cylinder;

a first port in said upper head providing communication between said first variable volume chamber and atmosphere; and a second port in said lower head providing communication between said second variable volume chamber and atmosphere, whereby selective pressurization and evacuation of said first and second variable volume chambers via said respective first and second ports effects axial movement of said reciprocatable hollow tube to effect insertion and retraction of said viewing head into and out of the vessel.

* * * * *